United States Patent [19]

Cummings

[11] 3,857,761

[45] Dec. 31, 1974

[54] EXHAUSTIVE ELECTROLYSIS METHOD FOR DETERMINATION OF OXYGEN DEMAND

[75] Inventor: John P. Cummings, Minneapolis, Minn.

[73] Assignee: Honeywell, Inc., Minneapolis, Minn.

[22] Filed: Dec. 1, 1972

[21] Appl. No.: 311,335

Related U.S. Application Data

[62] Division of Ser. No. 58,448, July 27, 1970, abandoned.

[52] U.S. Cl.......... 204/1 T, 204/195 B, 204/195 R, 204/266
[51] Int. Cl. ........................................ G01n 27/46
[58] Field of Search............ 204/1 T, 195 R, 195 B, 204/195 P, 230, 129

[56] References Cited
UNITED STATES PATENTS

| | | | |
|---|---|---|---|
| 2,773,493 | 12/1956 | Anzi et al...................... | 204/195 R |
| 3,045,665 | 7/1962 | Moyat................................ | 204/129 |
| 3,196,100 | 7/1965 | Digby.............................. | 204/195 P |
| 3,282,803 | 11/1966 | Poepel et al. ....................... | 204/1 T |
| 3,305,458 | 2/1967 | Tsien et al........................... | 204/1 T |
| 3,330,755 | 7/1967 | Mahany.............................. | 204/230 |

Primary Examiner—T. Tung
Attorney, Agent, or Firm—Arthur H. Swanson; Lockwood D. Burton; Mitchell J. Halista

[57] ABSTRACT

A method and apparatus for determing the oxygen demand of aqueous samples, the arrangement including cell means for receiving an aqueous sample during determination, the cell including an anode disposed within an anode compartment and a cathode disposed remote from the anode compartment. Bridging means are provided for electrolytically coupling the electrodes in the cell, the bridging means normally including an ion permeable membrane which extends continuously between the anode and cathode to physically isolate and electrically couple the electrodes. Temperature control means are provided for maintaining the cell at a constant temperature level, and electrical power means are coupled to the electrodes for delivering a predetermined integral quantity of electrolyzing current across the electrodes at a potential level sufficient for generating oxygen along the anode surface, the quantity of electrolyzing current normally being in excess of the quantity needed to render the solution substantially electro-inactive, this condition being reached, for example, upon the oxidation of at least a substantial portion of the organic waste products present in the sample. Means are provided for determining the quantity or rate of oxygen evolution as a result of the delivery of the integral quantity of electrolyzing current to the cell. The method may further incorporate an alkali metal hydroxide in the sample undergoing determination in order to achieve a pH in excess of about 10, the alkali metal hydroxide being utilized to absorb any carbon dioxide which may be generated as a result of oxidation of organic waste products.

6 Claims, 4 Drawing Figures

EXHAUSTIVE ELECTROLYSIS METHOD FOR DETERMINATION OF OXYGEN DEMAND

This is a division of application Ser. No. 58,448, filed on July 27, 1970, now abandoned.

CROSS-REFERENCE TO RELATED APPLICATION

The present invention is concerned with an electrolytic technique for determination of organic waste products in aqueous samples, and involves a substantially exhaustive electrolysis technique. A modified electrolytic system and technique for determination of organic waste products in aqueous samples is disclosed and claimed in my co-pending application entitled "ELECTROCHEMICAL OXYGEN DEMAND SYSTEM," executed on even date herewith, and assigned to the same assignee as the present invention.

BACKGROUND OF THE INVENTION

1. Field of the Invention

The present invention relates to an electrochemical oxygen demand sensor which is utilized to reasonably determine the amount of organic waste content present in aqueous samples, including raw, treated, or partially treated sewage samples, as well as industrial waste products or the like. The invention involves an electrolytic determination wherein a predetermined quantity of electrolyzing current is impressed across an anode and a cathode, with the concurrent measuring of oxygen partial pressure occurring as a result of the impression of the electrolyzing current across the electrodes.

2. Description of the Prior Art

The oxygen demand of aqueous samples is generally regarded as the single most important quality parameter utilized to monitor the effectiveness of treatment of sanitary and certain industrial plant effluents. The oxygen demand or the amount of dissolved oxygen required for the stabilization of dissolved organic material has traditionally been measured by means of the 5-day biochemical oxygen demand (BOD) test. Generally speaking, the BOD test determines the oxygen consumed by bacteria during their normal metabolic processes on dissolved and biologically unstabilized organic matter. Under normal conditions of temperature and pressure, about 20 days are required for complete stabilization, but practical and reasonably reproducible results may be obtained after a period of 5 days.

For many control purposes, the 5-day period is unreasonably long and unworkable. Therefore, several nonbiological tests have been introduced and utilized for measurement of dissolved organic matter. One such test is known as the chemical oxygen demand (COD) test which involves a 2-hour dichromate reflux period with concentrated sulfuric acid-dichromate solutions. This test is routinely utilized by the Public Health Service in water quality monitoring.

In addition to the COD test, several automated oxygen demand analyzers have been introduced and are currently being utilized. All of these automatic oxygen demand analyzers utilize the principle of complete combustion of the dissolved organic materials to the final oxidation products of carbon dioxide and water. An analysis of the product gases provides a measure of the oxygen demand. Normally, however, the oxygen demand analyzers of this type do not include a measure of organic nitrogen or dissolved sulfides, each of which contributes substantially to the oxygen load of a given waste stream. In addition, certain of these methods may include a measurement of the carbonates and dissolved carbon dioxide present in the system, neither of which contributes to the oxygen load.

Combustion devices have other serious disadvantages as well, including their high initial and operating costs, their complexity, as well as their requirement for a pressurized gas supply and purifier, as well as the need for periodic regeneration of the catalyst in the combustion chamber.

The apparatus of the present invention provides for the determination of electrochemical oxygen demand by electrolytic techniques which evaluate the oxygen load of a water system.

SUMMARY OF THE INVENTION

Briefly, in accordance with the present invention, the exhaustive electrolysis technique consists essentially of electrolyzing the test sample until the electrochemically active material is either quantitatively removed from the solution, or is changed into an inactive form. In this connection, the technique involves the passage of sufficient current to render the solutions substantially electro-inactive, or at least until a stable reaction rate is achieved. The solutions are deemed to be substantially electro-inactive when the current input to the cell delivers the theoretical quantity of evolved oxygen, according to Faraday's Law. The determinations are obtained by adjusting the electrode (anode) potential to a value sufficient to product gaseous oxygen. Under these conditions, the potential is sufficiently high to drive any possible organic electrode reactions to substantial completion. The general reactions possible at the anode are:

A. The oxidation of water or hydroxyl ions to oxygen;

B. The oxidation of any organic material present in the sample into various products; and C. The electrolytic treatment of inorganic substances which may be present in the sample. these general reactions being as follows:

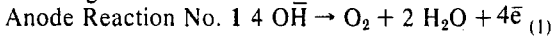
Anode Reaction No. 1  $4\ \overline{OH} \rightarrow O_2 + 2\ H_2O + 4\overline{e}$   (1)

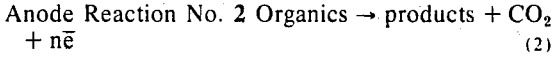
Anode Reaction No. 2  Organics $\rightarrow$ products + $CO_2$ + $n\overline{e}$   (2)

For practicing the concept, cell means are provided having a pair of spaced electrodes disposed therewithin, the cell being adapted to receive and retain an aqueous sample during the determination operation. The cell further includes bridging means which electrolytically couple the anode, which is disposed within a separate compartment, to the cathode which is disposed remote from the anode compartment. Temperature control means are provided for maintaining a constant temperature within the sample during the determination operation, and electrical power means are coupled to the anode and cathode for delivering a predetermined integral quantity of electrolyzing current across the electrodes at a suitable potential level. The electrical power means accordingly contributes to three simultaneous reactions, the first being the generation of oxygen, a portion of which may be combined directly with organic products present in the solution; the second being the electro-oxidation of organic products by reactions occurring at the electrode; the third being the electrode surface performing an oxidizing function under the reaction conditions. Means are provided in association with the anode compartment for determining the oxygen partial pressure or evolution rate upon delivery of the integral quantity of electrolyzing current, the oxygen partial pressure therefore providing an indication of that portion of the total power input which has contributed to the oxidation of organic waste products present in the sample. In order to achieve reproducible results, it has been found that an alkali metal hydroxide, such as potassium hydroxide (KOH) should be added to the sample undergoing determination, the quantity being sufficient to achieve a pH in excess of about 10. The alkali metal hydroxide combines with the carbon dioxide in the sample undergoing determination, and thereby provides a more precise determination of evolved oxygen content.

Therefore, it is a primary object of the present invention to provide an improved system for the determination of organic waste products in aqueous samples by electrolytic techniques, the system being adaptable for rapid and substantially continuous determinations of the quantities of organic waste products present in samples undergoing determination.

It is yet a further object of the present invention to provide an improved technique for the electrolytic determination of organic waste products in aqueous samples, involving the substantially complete oxidation of organic waste products present in the sample undergoing determination, with a corresponding determination of the evolution of oxygen from the electrolyzed sample.

Other and further objects of the present invention will become apparent to those skilled in the art upon a study of the following specification, appended claims, and accompanying drawings.

DESCRIPTION OF THE PREFERRED EMBODIMENTS

Figure 1:
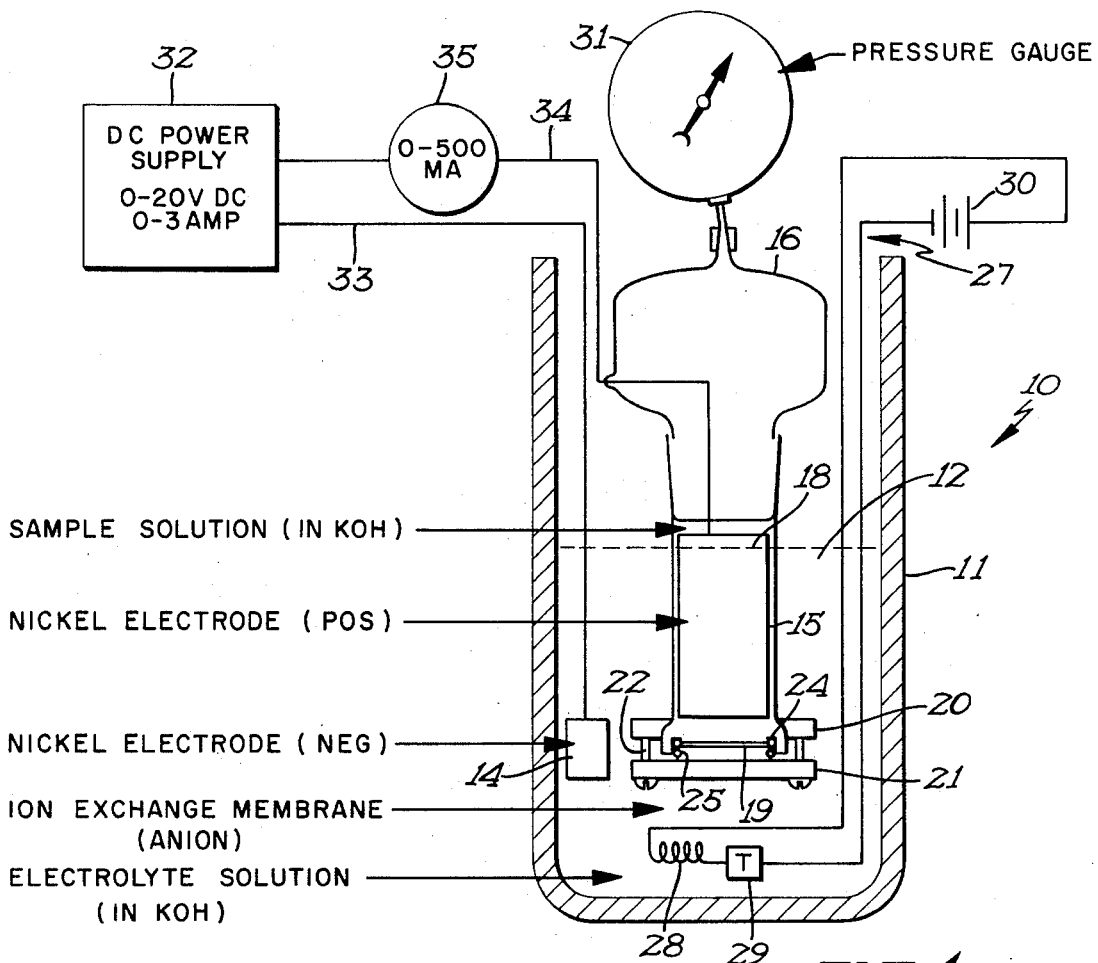
FIG. 1 is a vertical sectional view of a typical cell which may be utilized in accordance with the present invention, and illustrating, schematically, the electrical power supply, and metering apparatus.

In accordance with the preferred embodiment of the present invention, and with particular reference to FIG. 1 of the drawings, the electrolytic cell generally designated 10 includes a confining chamber or the like 11 which is adapted to receive and retain the aqueous sample during the quantitative determination of organic waste products present in the sample. For convenience, the member 11 may be in the form of a glass receptacle, crucible, or the like. The cell 10 further includes a cathode member 14 along with an anode 15, anode 15 being disposed within the enclosing anode compartment 16. Anode compartment 16 also receives and retains a quantity of the waste products therewithin, such as the sample shown as at 18. At the base of the anode compartment 16, there is disposed an ion exchange membrane 19 which provides for electrical continuity while permitting and maintaining a differential pressure build-up between the two compartments. The ion exchange membrane may be of any suitable commercially available membrane such as that membrane identified by the code mark ACMC-3470-XL Cation Exchange, and available from Ionac Chemical of Birmingham, New Jersey. The membrane is held in place by a pair of external flanges, such as the polytetrafluoroethylene flanges 20 and 21 which are secured together by any suitable means such as the screws 22–22, the membrane being further locked in fluid tight relationship by means of internal and external O-rings 24 and 25 respectively.

In order to maintain the solution at constant temperature, a heating control circuit is provided such as is shown generally at 27, the heating control system including a heater means 28 controlled by a thermostatic element 29, and being supplied with power by the electrical power source 30. As has been previously indicated, the apparatus should be held at a reasonably constant temperature throughout all determinations in order to enhance accuracy.

At the top of the anode compartment 16, there is provided a pressure gauge 31, this gauge being utilized to determine the partial pressure of oxygen present in the anode compartment. This gauge is preferably of the type capable of registering pressures in the range of from between about 0 and 200 mmHg, such gauges being, of course, commercially available.

In order to provide power for the electrolytic action, DC power supply source 32 is provided, along with leads 33 and 34 coupling the power supply to the cathode and anode respectively. A milliammeter 35 is provided in the system in order to achieve an indication of the delivery of power to the system. Typically, the power supply should be capable of delivering between 0 and 20 volts DC to the system, with a power capability of up to 3 amps. The milliammeter is provided compatible with the power supply.

While a variety of materials may be utilized for the electrodes, including, for example, metallic electrodes fabricated from platinum, gold, iridium, cobalt, palladium, rhodium, silver, or iron, it has been found that nickel is generally preferred because of its superior performance and accuracy. One such material that has been found particularly desirable is a nickel electrode, Fuel Cell Grade, available from Texas Instruments Co. of Dallas, Tex. While any suitable configuration is useful, a spiral configuration will normally provide an optimum surface availability with respect to volume requirements. Microporous nickel electrodes of this type are readily available and reasonably formable.

TYPICAL OPERATION OF THE EXHAUSTIVE ELECTROLYSIS TEST

The oxidation of organic compounds by electrolytic means is basically similar to the action of a strong oxidizing agent. The test method consists of electrolyzing the solution for a fixed period of time, preferably in the range of about 30 minutes. It will be appreciated, of course, that greater periods of time can be utilized, if desired, and also, a substantially constant or continuous system may be utilized pursuant to the aspects of the present invention. The electrochemical oxidation is obtained by adjusting the electrode (anode) potential to a value sufficient to produce gaseous oxygen. The reactions occurring at the anode are set forth in Equations (1) and (2) hereinabove, while hydrogen is being evolved at the cathode.

The fundamental principles underlying the concepts of the present invention can be explained on the basis of the competing reactions set forth in Equations (1) and (2) hereinabove. If an oxidizing current is passed through a simple electrolytic solution in the absence of electroactive material, gaseous oxygen will be produced as indicated by anodic reaction No. 1. For every four electrons passed through the cell, one molecule of gaseous oxygen is produced. Therefore, a relationship exists between the number of electrons passed and the amount of oxygen produced (Faraday's Law). In the event an electro-active organic material is present, electrons can also be transferred to the anode through a reaction such as that described by anode reaction No. 2. If the same number of electrons are transferred as before, a smaller amount of oxygen will be evolved, since electrons are furnished to the electrode by both reactions No. 1 and 2.

In the present technique, therefore, a fixed number of electrons (known coulombic input) are passed through the sample. By a previous calibration with pure water, such as distilled water or the like, the oxygen partial pressure increase at constant volume is determined for this coulombic input. The oxygen demand of the sample containing organic waste products is related to the difference in oxygen partial pressure observed with and without the organic material present. The pressure gauge 31 is used to monitor the oxygen partial pressure until the reaction is substantially complete. This can be accomplished by either electrolyzing for a period of time known to be in excess of the coulombic input necessary to complete the reaction, or by passing the current through the cell until the rate of oxygen production is equivalent to that of the calibration step. These methods are each illustrated in the curve of FIG. 2 where the relationship between the partial pressure of oxygen is given with respect to time for constant current input.

Figure 2:
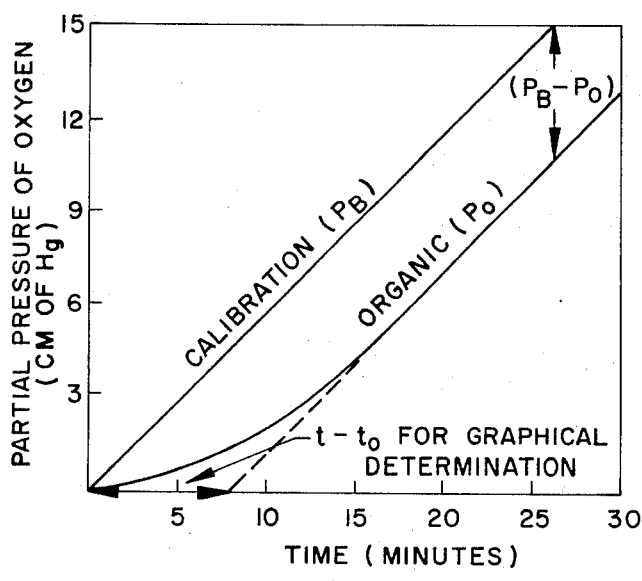
FIG. 2 is a graph illustrating the relationship between the increase in partial pressure of oxygen relative to time for a constant current operation.

In the curve of FIG. 2, it will be appreciated that the true readings obtained for a sample containing organic waste products will be shown by the solid line, where indicated, and that the extension of the straight line portion of that curve will intersect the abscissa at a point representing the time differential indicative of the degree of contamination of the sample. In other words, as the time differential increases, the oxygen demand will be greater, and conversely, as the indicated time interval decreases, the oxygen demand of the sample is less.

As the oxygen demand of a sample increases, the difference between the calibration pressure and the observed pressure with the organic waste material present also increases. In this operation, therefore, the only recording of data necessary is the partial pressure observed at the selected end point of the run.

For purposes of uniformity, the sample is preferably in a solution of 1N KOH, this solution providing a pH in the area of about 14. It has been appreciated that the solution should be moderately alkaline, with a pH in the area above about 10. The KOH acts as a means for combining with the $CO_2$ generated in the oxidizing reactions of the organic material present in the solution, and hence the partial pressure of $CO_2$ is not involved in the determination of the partial pressure of the anode compartment.

In a typical determination, the following conditions may be utilized:

| | |
|---|---|
| Current | 500 ma |
| Electrode: | Nickel (500 $cm^2$) |
| Electrolyte: | 1N KOH |
| Temperature: | 30° C. |
| Sample Volume: | 100 cc |
| Sample Concentrations: | 50, 100, 200 & 400 ppm |

The solution is then treated for a period of 30 minutes, or less than 30 minutes if exhaustive electrolysis had occurred prior to that time. The values obtained from this technique compare reasonably with those values obtained by conventional BOD tests, with the results obtained by the technique of the present invention having precision of results comparing favorably with those obtained with the BOD method.

Figure 3:
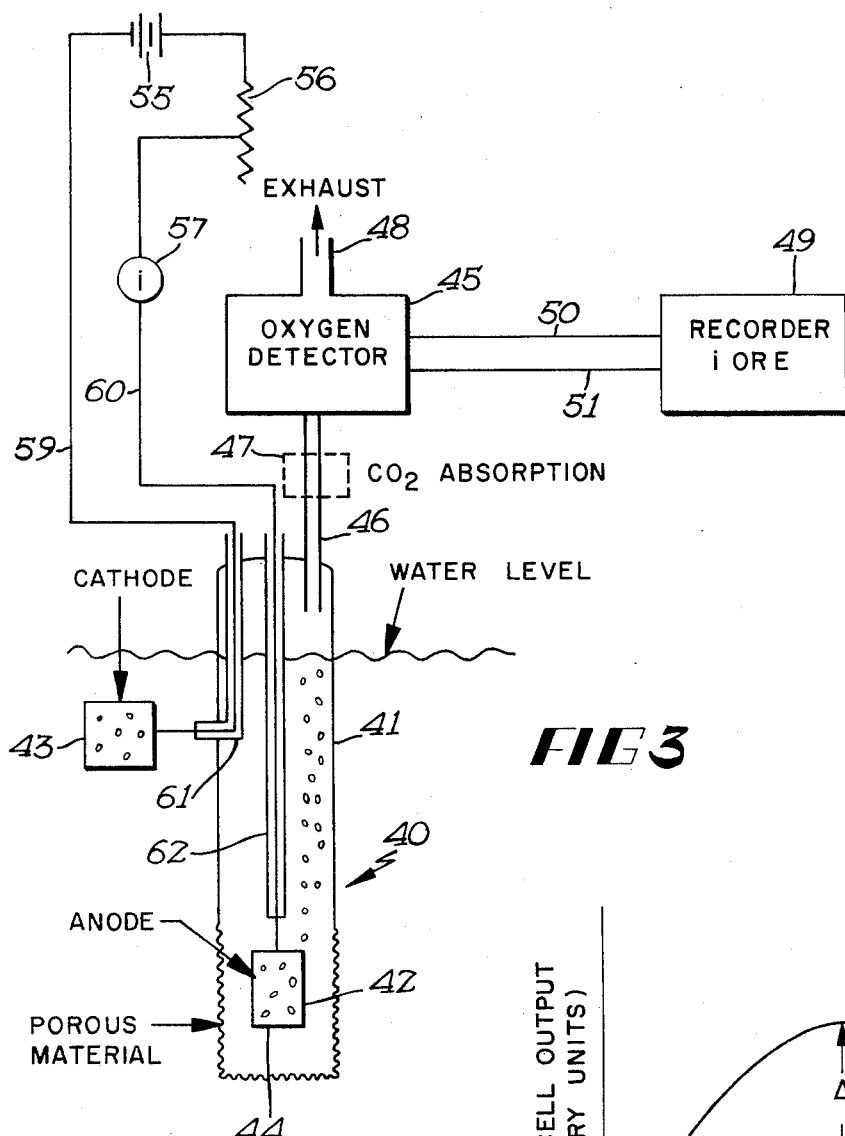
FIG. 3 is a view similar to FIG. 1 illustrating a system or apparatus susceptible for substantially continuous electrolytic monitoring of aqueous samples pursuant to the technique of the present invention.
Figure 4:
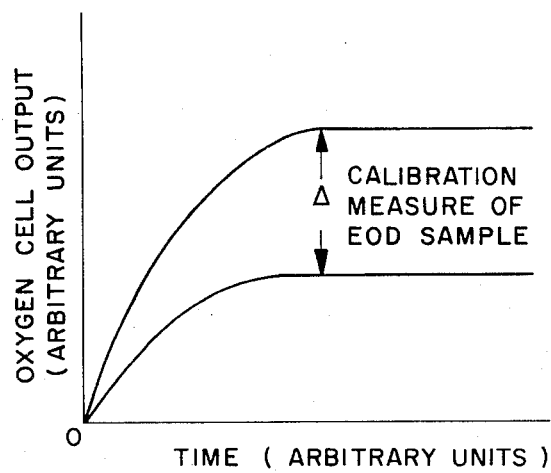
FIG. 4 is a graph illustrating a typical oxygen output with respect to time for a pure aqueous sample and a sample containing organic waste products.

Attention is now directed to FIGS. 3 and 4 of the drawings wherein a continuous monitoring system and technique is illustrated. In the system illustrated in FIG. 3, the cell generally designated 40 includes a container 41 having an open bottom to which is secured a porous enclosure member 42. Electrodes are provided in the form of a cathode 43 and an anode 44, these electrodes being separated, one from another, by the confining cell 41. An oxygen detector is provided in the system as at 45, the oxygen detector being coupled to the cell by means of the conduit 46. For purposes of accuracy in the determinations, a carbon dioxide absorption member is provided in the conduit 46 as at 47. Oxygen detector 45 is provided with an exhaust conduit as at 48, with a recorder being provided to monitor the output of the oxygen detector 45, this recorder being shown at 49. Leads 50 and 51 couple the recorder to the oxygen detector.

In order to provide suitable electrical power to the cathode and anode 43 and 44 respectively, a suitable source of DC power is provided as at 55, the magnitude of the power supply to the cell being controlled by the current controlling resistor 56, with an indication of the current flow being provided as at 57. Preferably, the current flow is maintained at a constant level in order to enhance the accuracy of the system. Leads 59 and 60 are utilized to couple the cathode 43 and anode 44 to the power source 55, and in order to avoid stray electrolysis reactions from occurring, the electrodes are encased in a suitable insulating and water-proof sleeve member such as the sleeves 61 and 62.

Attention is now directed to FIG. 4 wherein the output of the cell shown in FIG. 3 is graphically illustrated. The output of the oxygen cell, in arbitrary units, is plotted versus time, and the measure of the quantity of organic substances present in the sample is obtained by the difference in oxygen cell output from the sample, as compared to the output with pure or distilled water.

The function of the structure of FIG. 3 is essentially the same as that of the structure shown in FIG. 1. The instantaneous reaction rate as indicated by the rate of oxygen production is monitored in order to achieve an output. It will be appreciated that the cell may be of almost any configuration, as long as the electrode is open to the sample flow. The sample flow to the anode is preferably through a porous material so as to protect the electrode from large particle involvement. This electrode may be electrically connected to the cathode by means of dissolved ionic matter present in waste streams. As has been indicated, the power source 55 preferably is capable of delivering a constant current output to accommodate for changes in the electrical resistance of the solution. The oxygen detector may function on the basis of those commercially available oxygen detectors, including polarographic, galvanic, thermo-conductivity, paramagnetic, or as a simple oxygen flow meter. The output of this cell is fed to a recorder which indicates the oxygen flow potentiometrically. In the absence of organic waste materials, the oxygen cell output is at a maximum, since all current passing through the test cell is utilized to generate oxygen. With organic material present in the test solution, such as the constituents found in waste effluents, the rate of oxygen would drop to a lower value to the occurrence of the competitive reactions set forth in Equations (1) and (2) hereinabove. Accordingly, the difference between the rate of oxygen production with the sample and a calibration run, as indicated by the output of the oxygen cell, relates to the quantity of organic material present in the solution.

I claim:

1. The method of quantitatively determining the oxygen demand of aqueous samples comprising;
   a. placing an aqueous sample for oxygen demand determination into an electrolytic cell having a pair of electrodes in contact with said sample and including an anode disposed within an anode compartment, a cathode disposed remote from said anode compartment and an ion permeable membrane in contact with said sample to provide an electrolytic bridge between said anode and said cathode;
   b. adding an alkali metal hydroxide to said sample until the pH of said sample is in excess of about 10;
   c. applying an electrolyzing current across said electrodes at a potential suitable for the generation of oxygen along the sample contacting surface of the anode until the sample is substantially electro-inactive while maintaining said sample at a substantially constant temperature; and
   d. measuring the partial pressure of oxygen evolved from said anode-sample interface during said electrolyzing current application when said sample is substantially electro-inactive.

2. The method as defined in claim 1 being particularly characterized in that said alkali metal hydroxide is potassium hydroxide.

3. The method as defined in claim 1 being particularly characterized in that said sample is treated with potassium hydroxide until the solution concentration is substantially 1N.

4. The method as defined in claim 1 being particularly characterized in that said aqueous sample is maintained at a temperature of about 30° C.

5. The method as defined in claim 1 being particularly characterized in that said electrolyzing current flows through said cell at a substantially constant rate.

6. The method as defined in claim 5 being particularly characterized in that said electrolyzing current is maintained at substantially 500 ma.

* * * * *